US012475967B2

(12) United States Patent
Ku et al.

(10) Patent No.: US 12,475,967 B2
(45) Date of Patent: Nov. 18, 2025

(54) SEMICONDUCTOR DEVICES FOR CONTROLLING REFRESH OPERATIONS CONSIDERING REPAIR OPERATIONS

(71) Applicant: SK hynix Inc., Icheon-si (KR)

(72) Inventors: Sang Hyun Ku, Icheon-si (KR); Don Hyun Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 307 days.

(21) Appl. No.: 18/089,261

(22) Filed: Dec. 27, 2022

(65) Prior Publication Data

US 2024/0079078 A1    Mar. 7, 2024

(30) Foreign Application Priority Data

Sep. 5, 2022    (KR) .................. 10-2022-0112434

(51) Int. Cl.
*G11C 29/44*   (2006.01)
*G11C 29/00*   (2006.01)
*G11C 29/12*   (2006.01)

(52) U.S. Cl.
CPC ........ *G11C 29/4401* (2013.01); *G11C 29/785* (2013.01); *G11C 2029/1202* (2013.01)

(58) Field of Classification Search
CPC .................... G11C 29/4401; G11C 29/785
USPC ................................................. 365/185.09
See application file for complete search history.

(56) References Cited

U.S. PATENT DOCUMENTS

| | | | | |
|---|---|---|---|---|
| 9,349,491 | B1 * | 5/2016 | Morgan | G11C 29/88 |
| 9,478,316 | B1 * | 10/2016 | Ryu | G11C 29/76 |
| 10,825,544 | B2 * | 11/2020 | Wieduwilt | G11C 29/78 |
| 11,869,568 | B2 * | 1/2024 | Go | G11C 11/4087 |
| 11,961,548 | B2 * | 4/2024 | Kim | G11C 11/40615 |
| 2010/0290296 | A1 * | 11/2010 | Lee | G11C 29/24 365/200 |
| 2020/0090729 | A1 * | 3/2020 | Son | G06F 3/0673 |
| 2021/0200625 | A1 * | 7/2021 | Park | G06F 11/0751 |
| 2021/0335446 | A1 | 10/2021 | Nakamura | |
| 2022/0189573 | A1 * | 6/2022 | Kim | G11C 11/40622 |

(Continued)

FOREIGN PATENT DOCUMENTS

KR    1020210082769 A    7/2021

*Primary Examiner* — Alexander Sofocleous
*Assistant Examiner* — Duy H Luong
(74) *Attorney, Agent, or Firm* — WILLIAM PARK AND ASSOCIATES LTD.

(57) ABSTRACT

A semiconductor device includes a redundancy control signal generation circuit configured to generate a redundancy control signal by determining whether a row address for an active operation has been repaired through a soft post package repair operation and determining whether a row hammer phenomenon has occurred with respect to the row address. The semiconductor device also includes a first selection address generation circuit configured to generate a first selection address for driving a sub word line or a redundancy word line from one of a repair address and a first internal address, based on the redundancy control signal. The semiconductor device further includes a second selection address generation circuit configured to generate a second selection address for driving the sub word line or the redundancy word line from one of a fixed address and a second internal address, based on the redundancy control signal.

26 Claims, 18 Drawing Sheets

(56) References Cited

U.S. PATENT DOCUMENTS

2023/0044186 A1\* 2/2023 You .................... G11C 11/4093
2023/0111467 A1\* 4/2023 Cho .................... G11C 29/783
　　　　　　　　　　　　　　　　　　　　　365/185.09

\* cited by examiner

FIG.3

| R_HIT | REF_F | RCNT |
|-------|-------|------|
| L | X | L |
| H | L | H |
| H | H | L |

FIG.10

| RCNT | FIXA<2> | FIXA<1> | IADD2<2> | IADD2<1> | SADD2<2> | SADD2<1> |
|---|---|---|---|---|---|---|
| L | X | X | L | H | L | H |
| L | X | X | H | L | H | L |
| H | H | L | X | X | H | L |

SEMICONDUCTOR DEVICES FOR CONTROLLING REFRESH OPERATIONS CONSIDERING REPAIR OPERATIONS

CROSS-REFERENCE TO RELATED APPLICATIONS

The present application claims priority under 35 U.S.C. 119(a) to Korean Patent Application No. 10-2022-0112434, filed on Sep. 5, 2022, in the Korean Intellectual Property Office, which is incorporated herein by reference in its entirety.

BACKGROUND

1. Technical Field

Embodiments of the present disclosure relate to semiconductor devices for controlling a refresh operation considering a repair operation.

2. Related Art

In general, a repair operation of replacing defective memory cells with redundancy cells is performed for a semiconductor device. The repair operation may include a normal repair operation that is performed on a memory cell in which a defect is found through a test performed in a wafer state, and a post-package repair (PPR) operation that is performed on a memory cell in which a defect is found through a test performed after packaging of the semiconductor device.

Meanwhile, when a semiconductor device repeatedly performs an active operation on a specific word line, a row hammer phenomenon may occur in which reliability of data stored in a memory cell that is connected to an adjacent word line is degraded.

SUMMARY

In accordance with the present disclosure is a semiconductor device including: a redundancy control signal generation circuit configured to generate a redundancy control signal by determining whether a row address for an active operation has been repaired through a soft post package repair operation and determining whether a row hammer phenomenon has occurred with respect to the row address; a first selection address generation circuit configured to generate a first selection address for driving a sub word line or a redundancy word line from one of a repair address and a first internal address, based on the redundancy control signal; and a second selection address generation circuit configured to generate a second selection address for driving the sub word line or the redundancy word line from one of a fixed address and a second internal address, based on the redundancy control signal.

Also in accordance with the present disclosure is a semiconductor device including a sub word line drive control circuit configured to drive one of a sub word line, an adjacent word line located adjacent to the sub word line, and redundancy word line by determining whether a row address for an active operation has been repaired through a soft post package repair operation and determining whether a row hammer phenomenon has occurred with respect to the row address. The semiconductor device further includes a memory bank including a normal region in which the sub word line and the adjacent word line are located, and a redundancy region in which the redundancy word line is located.

BRIEF DESCRIPTION OF THE DRAWINGS

FIG. 3 is a table illustrating an operation of a redundancy control signal generation circuit according to an embodiment of the present disclosure.

FIG. 10 is a table illustrating an operation of generation of a second selection address of a second selection address generation circuit according to an embodiment of the present disclosure.

DETAILED DESCRIPTION

In the following description of embodiments, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed.

It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage corresponds to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

The term "logic bit set" may mean a combination of logic levels of bits included in a signal. When the logic level of each of the bits included in the signal is changed, the logic bit set of the signal may be set differently. For example, when the signal includes 2 bits, when the logic level of each of the 2 bits included in the signal is "logic low level, logic low level", the logic bit set of the signal may be set as the first logic bit set, and when the logic level of each of the two bits included in the signal is "a logic low level and a logic high level", the logic bit set of the signal may be set as the second logic bit set.

Various embodiments of the present disclosure will be described hereinafter in more detail with reference to the accompanying drawings. However, the embodiments described herein are for illustrative purposes only and are not intended to limit the scope of the present disclosure.

Figure 1:
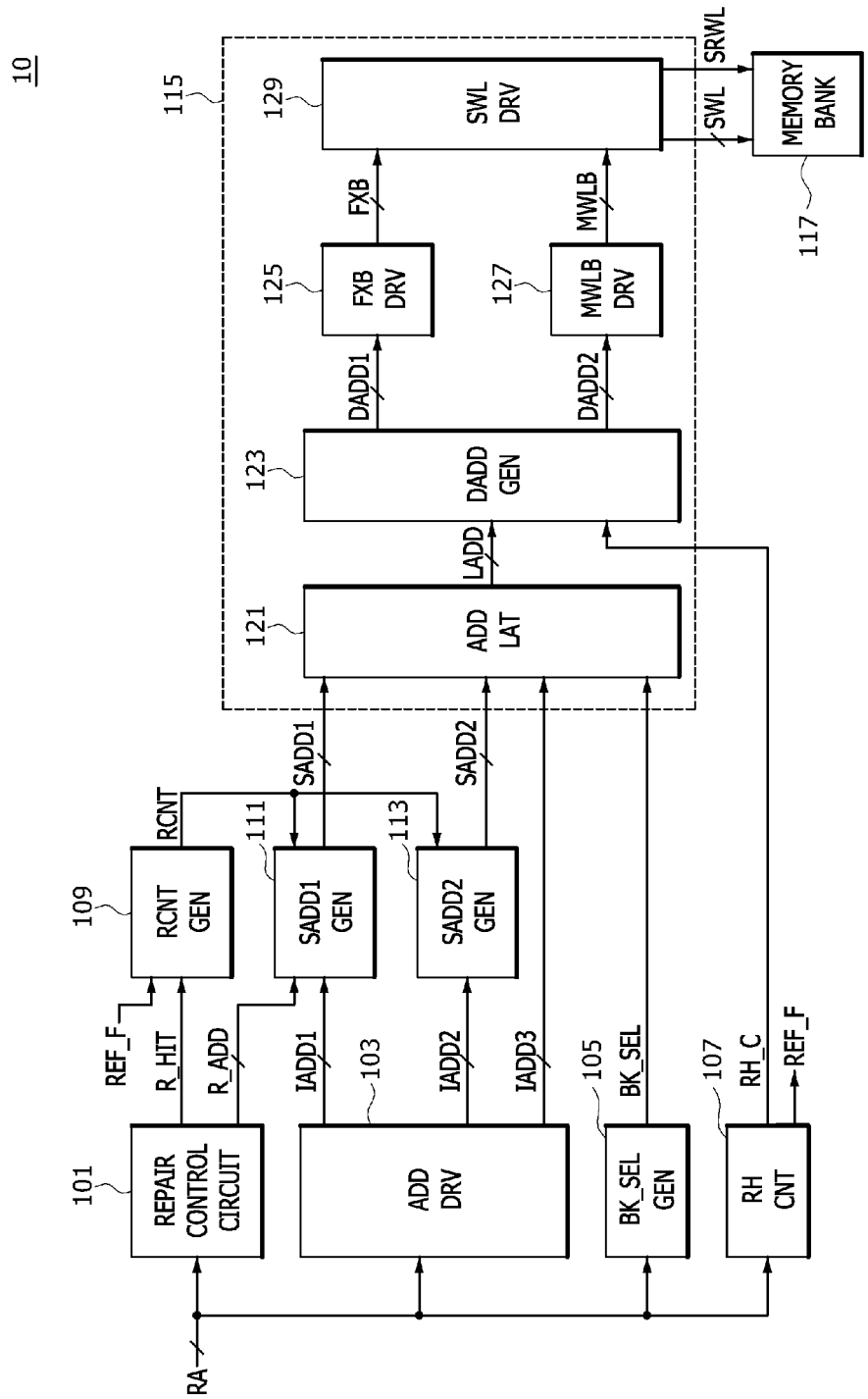
FIG. 1 is a block diagram illustrating a configuration of a semiconductor device according to an embodiment of the present disclosure.

FIG. 1 is a block diagram illustrating a configuration of a semiconductor device 10 according to an embodiment of the present disclosure. As shown in FIG. 1, the semiconductor device 10 may include a repair control circuit 101, an address driver (ADD DRV) 103, a bank selection signal generation circuit (BK_SEL GEN) 105, a row hammer control circuit (RH CNT) 107, a redundancy control signal generation circuit (RCNT GEN) 109, a first selection address generation circuit (SADD1 GEN) 111, a second selection address generation circuit (SADD2 GEN) 113, a sub word line drive control circuit 115, and a memory bank 117.

The repair control circuit 101 may store a failure address (F_ADD of FIG. 2) that corresponds to a sub word line SWL to which the memory cell that is repaired through a soft post package repair operation. The soft post package repair operation may be initiated based on information stored in a mode register (not shown). The repair control circuit 101 may store the failure address (F_ADD in FIG. 2) while the power is maintained, and may delete the stored failure address (F_ADD in FIG. 2) when the power is turned off. In the soft post package repair operation, one failure address (F_ADD of FIG. 2) may be allocated to each bank or bank group. The failure address (F_ADD in FIG. 2) may be set as a row address RA corresponding to the sub word line SWL to which the repaired memory cell is connected through a test performed after packaging. The repair control circuit 101 may generate a repair detection signal R_HIT that is activated to indicate that the row address RA is an address repaired through the soft post package repair operation when the row address (RA) for an active operation is the same as the failure address (F_ADD in FIG. 2). The repair control circuit 101 may generate a repair address R_ADD for driving the soft redundancy word line SRWL replacing the sub word line SWL that is driven by the row address RA when the repair detection signal R_HIT is activated. The repair address R_ADD may include information on a word line selection signal FXB and a main word line signal MWLB that are necessary to drive the soft redundancy word line SRWL that replaces the sub word line SWL through the soft post package repair operation. The soft post package repair operation may be distinguished from a hard post package repair operation in which failure address information is maintained even when power is turned off by changing physical fuse information. According to an embodiment, the repair control circuit 101 may be implemented to store a failure address for the hard post package repair operation or to store a failure address for a normal repair operation. The repair control circuit 101 may be connected to the redundancy control signal generation circuit 109 and the first selection address generation circuit 111 to output the repair detection signal R_HIT to the redundancy control signal generation circuit 109 and to output the repair address R_ADD to the first selection address generation circuit 111.

The address driver 103 may drive a first internal address IADD1, a second internal address IADD2, and a third internal address IADD3, based on the row address RA for an active operation. The first internal address IADD1 may include information for selecting the word line selection signal FXB and the main word line signal MWLB that are necessary for driving the sub word line SWL in the active operation. The first internal address IADD1 may include a plurality of bits, and a logic bit set of the bits included in the first internal address IADD1 may be determined to generate the word line selection signal FXB and the main word line signal MWLB that are necessary to drive the sub word line SWL that is activated in the active operation. The second internal address IADD2 may include information for distinguishing odd-numbered sub word lines SWL and even-numbered sub word lines SWL among the sub word lines SWL. The second internal address IADD2 may include a plurality of bits, and a logic bit set of the bits included in the second internal address IADD2 may be determined to distinguish the odd-numbered sub-word lines SWL and the even-numbered sub word lines SWL among the sub word lines SWL. The third internal address IADD3 may include information for distinguishing the sub-word lines SWL and the soft redundancy word lines SRWL. The third internal address IADD3 may include a plurality of bits, and a logic bit set of the bits included in the third internal address IADD3 may be determined to distinguish the sub-word lines SWL and the soft redundancy word lines SRWL. The address driver 103 may be connected to the first selection address generation circuit 111, the second selection address generation circuit 113, and the address latch circuit 121 to output the first internal address IADD1 to the first selection address generation circuit 111, to output the second internal address IADD2 to the second selection address generation circuit 113, and to output the third internal address IADD3 to the address latch circuit 121.

The bank selection signal generation circuit 105 may generate a bank selection signal BK_SEL, based on the row address RA for the active operation. The bank selection signal generation circuit 105 may generate the bank selection signal BK_SEL for selecting the memory bank 117 on which the active operation is performed. The memory bank 117 may include a normal region (e.g., 2111 of FIG. 6, 212_1 of FIG. 7, 213_1 of FIG. 8, and 214_4 of FIG. 9) in which the sub word lines SWL are located, and a soft redundancy region (e.g., 211_4 of FIG. 6, 212_3 of FIG. 7, 213_2 of FIG. 8, and 214_1 of FIG. 9) in which the soft redundancy word lines SRWL are located. In the present embodiment, the memory bank 117 is displayed as one block, but may be implemented with a plurality of blocks selected by the bank selection signal BK_SEL. The bank selection signal generation circuit 105 may be connected to the address latch circuit 121 to output the bank selection signal BK_SEL to the address latch circuit 121.

The row hammer control circuit 107 may generate a refresh flag REF_F and a row hammer control signal RH_C, based on the row address RA for the active operation. The row hammer control circuit 107 may count the number of times the sub word lines SWL are driven by the row address RA and active operations are performed for each sub word line SWL, and may detect that a row hammer phenomenon has occurred for the corresponding row address RA when the number of times the active operations are performed is equal to or greater than a set value to generate the refresh flag REF_F that is activated for a refresh operation on at least one adjacent word line (not shown) located adjacent to the sub word line SWL accessed by the row address RA. The row hammer control circuit 107 may generate the row hammer control signal RH_C that is activated for selectively activating each of the adjacent word lines when the refresh flag REF_F is activated. The row hammer control circuit 107 may be connected to the redundancy control signal generation circuit 109 and the decoding address generation circuit 123 to output the refresh flag REF_F to the redundancy control signal generation circuit 109, and to output the row hammer control signal RH_C to the decoding address generation circuit 123.

The redundancy control signal generation circuit 109 may be connected to the repair control circuit 101 and the row hammer control circuit 107 to receive the repair detection signal R_HIT from the repair control circuit 101, and to receive the refresh flag REF_F from the row hammer control circuit 107. The redundancy control signal generation circuit 109 may generate a redundancy control signal RCNT, based on the repair detection signal R_HIT and the refresh flag REF_F. The redundancy control signal generation circuit 109 may generate an inactive redundancy control signal RCNT when an inactive repair detection signal R_HIT is generated because the row address RA for the active operation is different from the failure address (F_ADD of FIG. 2). That is, the redundancy control signal generation circuit 109 may generate the inactive redundancy control signal RCNT when the row address RA is not the address that is repaired through the soft post package repair operation. The redundancy control signal generation circuit 109 may generate an activated redundancy control signal RCNT when an activated repair detection signal R_HIT is generated because the row address RA is the same as the failure address (F_ADD in FIG. 2) and an inactive refresh flag REF_F is generated because the row hammer phenomenon does not occur with respect to the row address RA. That is, the redundancy control signal generation circuit 109 may generate the activated redundancy control signal RCNT when the row address RA is the address repaired through the soft post package repair operation and a refresh operation is not performed on at least one adjacent word line that is adjacent to the sub word line SWL activated according to the row address RA because the row hammer phenomenon does not occur with respect to the row address RA. The redundancy control signal generation circuit 109 may generate an inactive redundancy control signal RCNT when an activated repair detection signal R_HIT is generated because the row address RA is the same as the failure address (F_ADD in FIG. 2), and an activated refresh flag REF_F is generated because the row hammer phenomenon occurs with respect to the row address RA. That is, the redundancy control signal generation circuit 109 may generate the inactive redundancy control signal RCNT when the row address RA is the address repaired through the soft post package repair operation, and a refresh operation is performed on the adjacent word lines that are adjacent to the sub-word line SWL activated according to the row address RA because the row hammer phenomenon occurs with respect to the row address RA. The redundancy control signal generation circuit 109 may be connected to the first selection address generation circuit 111 and the second selection address generation circuit 113 to output the redundancy control signal RCNT to the first selection address generation circuit 111 and the second selection address generation circuit 113.

The first selection address generation circuit 111 may be connected to the repair control circuit 101, the address driver 103, and the redundancy control signal generation circuit 109 to receive the repair address R_ADD from the repair control circuit 101, to receive the first internal address IADD1 from the address driver 103, and to receive the redundancy control signal RCNT from the redundancy control signal generation circuit 109. The first selection address generation circuit 111 may generate a first selection address SADD1 from the repair address R_ADD or the first internal address IADD1, based on the redundancy control signal RCNT. The first selection address generation circuit 111 may output the repair address R_ADD as the first selection address SADD1 for selecting the redundancy word line to be replaced through the soft post package repair operation when the redundancy control signal RCNT is activated. The first selection address generation circuit 111 may output the first internal address IADD1 as the first selection address SADD1 for driving the sub word line SWL by the row address RA in the active operation when the redundancy control signal RCNT is deactivated. The first selection address generation circuit 111 may be connected to the address latch circuit 121 to output the first selection address SADD1 to the address latch circuit 121.

The second selection address generation circuit 113 may be connected to the address driver 103 and the redundancy control signal generation circuit 109 to receive the second internal address IADD2 from the address driver 103, and to receive the redundancy control signal RCNT from the redundancy control signal generation circuit 109. The second selection address generation circuit 113 may generate a second selection address SADD2 from the second internal address IADD2, based on the redundancy control signal RCNT or may set the second selection address SADD2 to have a preset logic bit set. The second selection address generation circuit 113 may set the second selection address SADD2 to have the preset logic bit set to drive the soft redundancy word lines SRWL when the redundancy control signal RCNT is activated. The second selection address generation circuit 113 may output the second internal address IADD2 as the second selection address SADD2 to drive the sub word lines SWL when the redundancy control signal RCNT is deactivated. The second selection address generation circuit 113 may be connected to the address latch circuit 121 to output the second selection address SADD2 to the address latch circuit 121.

The sub word line drive control circuit 115 may include the address latch circuit (ADD LAT) 121, the decoding address generation circuit (DADD GEN) 123, a word line selection signal driver (FXB DRV) 125, a main word line driver (MWLB DRV) 127, and a sub word line driver (SWL DRV) 129.

The address latch circuit 121 may be connected to the address driver 103, the bank selection signal generation circuit 105, the first selection address generation circuit 111, and the second selection address generation circuit 113 to receive the third internal address IADD3 from the address driver 103, to receive the bank selection signal BK_SEL from the bank selection signal generation circuit 105, to receive the first selection address SADD1 from the first selection address generation circuit 111, and to receive the second selection address SADD2 from the second selection address generation circuit 113. The address latch circuit 121 may latch the first selection address SADD1, the second selection address SADD2, and the third internal address IADD3 to generate a latch address LADD when the bank selection signal BK_SEL is activated. The address latch circuit 121 may latch the first selection address SADD1 that is set as the first internal address IADD1 and the second selection address SADD2 that is set as the second internal address IADD2 for driving the sub word lines SWL by the row address RA when the redundancy control signal RCNT is deactivated, and the third internal address IADD3 to generate the latch address LADD. The address latch circuit 121 may latch the first selection address SADD1 that is set as the repair address R_ADD and the second selection address SADD2 that is set to have a preset logic set for driving the soft redundancy word lines SRWL through the soft post repair operation when the redundancy control signal RCNT is activated, and the third internal address IADD3 to generate the latch address LADD. The address latch circuit 121 may be connected to the decoding address generation circuit 123 to output the latch address LADD to the decoding address generation circuit 123. Although the address latch circuit 121 is represented as one block, the address latch circuit 121 may be provided for each memory bank that is selected depending on the bank selection signal BK_SEL according to an embodiment.

The decoding address generation circuit 123 may be connected to the row hammer control circuit 107 and the address latch circuit 121 to receive the row hammer control signal RH_C from the row hammer control circuit 107, and to receive the latch address LADD from the address latch circuit 121. The decoding address generation circuit 123 may decode the latch address LADD to generate a first decoding address DADD1 and a second decoding address DADD2, based on the row hammer control signal RH_C. The decoding address generation circuit 123 may decode the latch address LADD to generate the first decoding address DADD1 and the second decoding address DADD2 for driving the sub word lines SWL or the soft redundancy word lines SRWL when it is confirmed that the row hammer phenomenon has not occurred for the row address RA, based on the row hammer control signal RH_C. The decoding address generation circuit 123 may decode the latch address LADD to generate the first decoding address DADD1 and the second decoding address DADD2 for driving at least one adjacent word line that is adjacent to the sub word lines SWL when it is confirmed that the row hammer phenomenon has occurred for the row address RA, based on the row hammer control signal RH_C. The decoding address generation circuit 123 may be connected to the word line selection signal driver 125 and the main word line driver 127 to output the first decoding address DADD1 to the word line selection signal driver 125, and to output the second decoding address DADD2 to the main word line driver 127. The number or positions of the adjacent word lines selected according to the row hammer phenomenon may be variously set according to embodiments.

The word line selection signal driver 125 may be connected to the decoding address generation circuit 123 to receive the first decoding address DADD1 from the decoding address generation circuit 123. The word line selection signal driver 125 may generate a word line selection signal FXB, based on the first decoding address DADD1. The word line selection signal driver 125 may generate the word line selection signal FXB for selectively driving one of the sub word line SWL, the adjacent word line, and the soft redundancy word line SRWL, based on the first decoding address DADD1. The word line selection signal driver 125 may be connected to the sub word line driver 129 to output the word line selection signal FXB to the sub word line driver 129.

The main word line driver 127 may be connected to the decoding address generation circuit 123 to receive the second decoding address DADD2 from the decoding address generation circuit 123. The main word line driver 127 may generate a main word line signal MWLB, based on the second decoding address DADD2. The main word line driver 127 may generate the main word line signal MWLB for driving one of the sub word line SWL, the adjacent word line, and the soft redundancy word line SRWL, based on the second decoding address DADD2. The main word line driver 127 may be connected to the sub word driver 129 to output the main word line signal MWLB to the sub word line driver 129.

The sub word line driver 129 may be connected to the word line selection signal driver 125 and the main word line driver 127 to receive the word line selection signal FXB from the word line selection signal driver 125, and to receive the main word line signal MWLB from the main word line driver 127. The sub word line driver 129 may selectively drive one of the sub word line SWL, the adjacent word line, and the soft redundancy word line SRWL, based on the word line selection signal FXB and the main word line signal MWLB.

The sub word line drive control circuit 115 may receive the first selection address SADD1 that is set as the first internal address IADD1, the second selection address SADD2 that is set as the second internal address IADD2, and the third internal address IADD3 to drive the sub word line SWL when the row address RA for the active operation is not the address repaired through the soft post package repair operation. The sub word line drive control circuit 115 may receive the first selection address SADD1 that is set as the repair address R_ADD, the second selection address SADD2 that is set to have the preset logic bit set, and the third internal address IADD3 to drive the soft redundancy word line SRWL when the row address RA for the active operation is the address repaired through the soft post package repair operation, and the row hammer phenomenon does not occur with respect to the row address RA. The sub word line drive control circuit 115 may receive the first selection address SADD1 that is set as the first internal address IADD1, the second selection address SADD2 that is set as the second internal address IADD2, and the third internal address IADD3 to drive the adjacent word line located adjacent to the sub word line SWL when the row address RA for the active operation is the address repaired through the soft post package repair operation, and the row hammer phenomenon occurs with respect to the row address RA.

Figure 2:
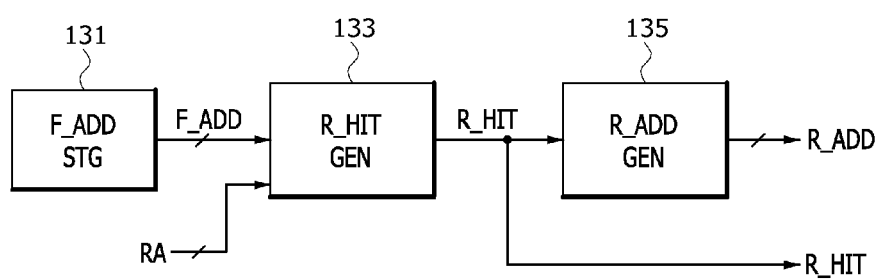
FIG. 2 is a block diagram illustrating a configuration of a repair control circuit according to an embodiment of the present disclosure.

FIG. 2 is a block diagram illustrating a configuration of a repair control circuit 101A according to an embodiment of the present disclosure. As shown in FIG. 2, the repair control circuit 101A may include a failure address storage circuit (F_ADD STG) 131, a repair detection signal generation circuit (R_HIT GEN) 133, and a repair address generation circuit (R_ADD GEN) 135.

The failure address storage circuit 131 may store a failure address F_ADD that corresponds to the sub word line SWL to which the memory cell repaired through the soft post package repair operation is connected. The failure address storage circuit 131 may store the failure address F_ADD while power is maintained for the soft post package repair operation, and may delete the stored failure address F_ADD when the power is turned off. The failure address storage circuit 131 may store the failure address F_ADD, which is allocated one for each bank or bank group. The failure address storage circuit 131 may be connected to the repair detection signal generation circuit 133 to output the failure address F_ADD to the repair detection signal generation circuit 133.

The repair detection signal generation circuit 133 may be connected to the failure address storage circuit 131 to receive the failure address F_ADD from the failure address storage circuit 131. The repair detection signal generation circuit 133 may generate a repair detection signal R_HIT that is activated to indicate that the row address RA is the address repaired through the soft post package repair operation when the row address RA for the active operation is the same as the failure address F_ADD. The repair detection signal generation circuit 133 may be connected to the repair address generation circuit 135 to output the repair detection signal R_HIT to the repair address generation circuit 135.

The repair address generation circuit 135 may be connected to the repair detection signal generation circuit 133 to receive the repair detection signal R_HIT from the repair detection signal generation circuit 133. The repair address generation circuit 135 may generate a repair address R_ADD, based on the repair detection signal R_HIT. The repair address generation circuit 135 may generate the repair address R_ADD including information on a word line selection signal FXB and a main word line signal MWLB that are necessary to drive the soft redundancy word line SRWL that replaces the sub word line SWL driven by the row address RA when the soft post package repair operation is performed and the repair detection signal R_HIT is activated.

Figure 3:
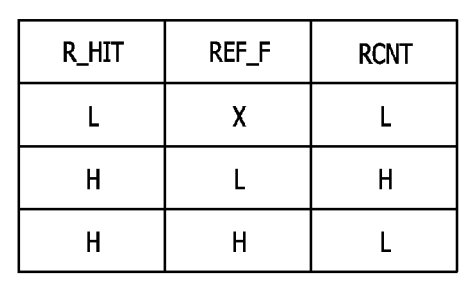

FIG. 3 is a table illustrating an operation of a redundancy control signal generation circuit 109 according to an embodiment of the present disclosure. As shown in FIG. 3, the redundancy control signal generation circuit 109 may generate a redundancy control signal RCNT whose activation is determined based on a repair detection signal R_HIT and a refresh flag REF_F. As an example, the redundancy control signal generation circuit 109 may generate a redundancy control signal RCNT that is deactivated at a logic "low" level regardless of whether the refresh flag REF_F is activated when a row address RA for an active operation is different from a failure address F_ADD and a repair detection signal R_HIT deactivated at a logic "low" level ("L") is generated. As another example, the redundancy control signal generation circuit 109 may generate a redundancy control signal RCNT that is activated at a logic "high" level ("H") when a repair detection signal R_HIT activated at a logic "high" level ("H") is generated because the row address RA for the active operation is the same as the failure address F_ADD, and a refresh flag REF_F deactivated at a logic "low" level ("L") is generated because a row hammer phenomenon has occurred for the row address RA. As further another example, the redundancy control signal generation circuit 109 may generate a redundancy control signal RCNT that is deactivated at a logic "low" level ("L") when a repair detection signal R_HIT activated at a logic "high" level ("H") is generated because the row address RA for the active operation is the same as the failure address F_ADD, and a refresh flag REF_F activated at a logic "high" level ("H") is generated because a row hammer phenomenon has occurred for the row address RA.

Figure 4:
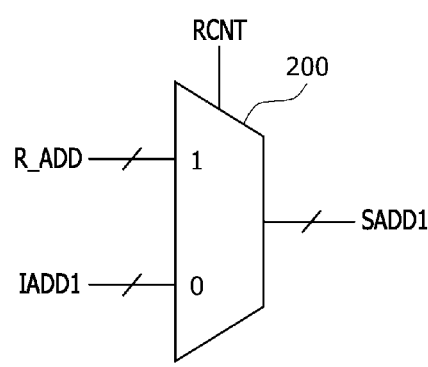
FIG. 4 is a circuit diagram of a first selection address generation circuit according to an embodiment of the present disclosure.

FIG. 4 is a circuit diagram of a first selection address generation circuit 111A according to an embodiment of the present disclosure. As shown in FIG. 4, the first selection address generation circuit 111A may include a selector 200 that generates a first selection address SADD1 from a repair address R_ADD and a first internal address IADD1, based on a redundancy control signal RCNT. As an example, the first selection address generation circuit 111A may output the first internal address IADD1 input to a first input terminal "0" by the redundancy control signal RCNT that is deactivated at a logic "low" level when a row address RA for an active operation is not the address repaired through the soft post package repair operation as the first selection address SADD1. As another example, the first selection address generation circuit 111A may output the repair address R_ADD input to a second input terminal "1" by the redundancy control signal RCNT that is activated at a logic "high" level when the row address RA for an active operation is the address repaired through the soft post package repair operation and a row hammer phenomenon does not occur to the row address RA, as the first selection address SADD1. As further another example, the first selection address generation circuit 111A may output the first internal address IADD1 input to the first input terminal "0" by the redundancy control signal RCNT that is deactivated at a logic "low" level when the row address RA for an active operation is the address repaired through the soft post package repair operation and the row hammer phenomenon does not occur to the row address RA, as the first selection address SADD1.

Figure 5:
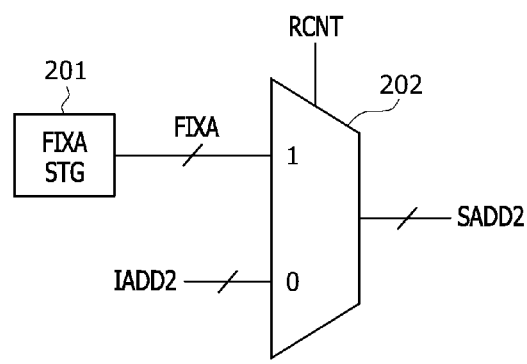
FIG. 5 is a circuit diagram of a second selection address generation circuit according to an embodiment of the present disclosure.

FIG. 5 is a circuit diagram of a second selection address generation circuit 113A according to an embodiment of the present disclosure. As shown in FIG. 5, the second selection address generation circuit 113A may include a fixed address storage circuit (FIXA STG) 201 and a selector 202. The fixed address storage circuit 201 may store a fixed address FIXA that is set to have a preset logic bit set. The selector 202 may generate a second selection address SADD2 from a second internal address IADD2, based on a redundancy control signal RCNT, or may set the second selection address SADD2 to have the preset logic bit set. As an example, the second selection address generation circuit 113A may output the second internal address IADD2 input to a first input terminal "0" by the redundancy control signal RCNT that is deactivated at a logic "low" level when the row address RA for the active operation is not the address repaired through the soft post package repair operation, as the second selection address SADD2. As another example, the second selection address generation circuit 113A may output the fixed address FIXA input to a second input terminal "1" by the redundancy control signal RCNT activated at a logic "high" level when the row address RA for the active operation is the address repaired through the soft post package repair operation and the row hammer phenomenon does not occur in the row address RA, as the second selection address SADD2. In this case, the second selection address SADD2 may be set to have a logic bit set that is preset by the fixed address FIXA. As further another example, the second selection address generation circuit 113A may output the second internal address IADD2 input to the first input terminal "0" by the redundancy control signal RCNT deactivated at a logic "low" level when the row address RA for the active operation is the address repaired through the soft post package repair operation and the row hammer phenomenon does not occur in the row address RA, as the second selection address SADD2.

FIGS. 6 to 9 are block diagrams illustrating configurations of memory banks 117A, 117B, 117C, and 117D according to various embodiments of the present disclosure.

Figure 6:
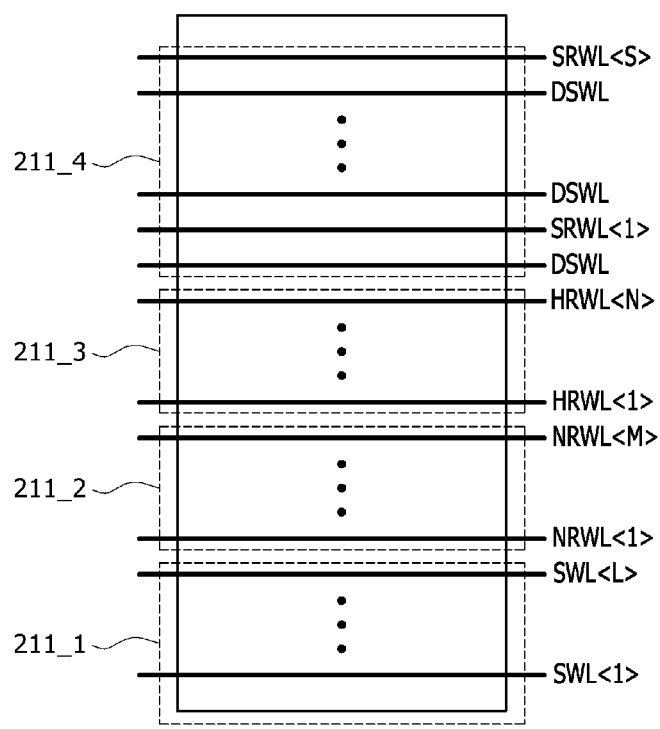
FIGS. 6 to 9 are block diagrams illustrating configurations of memory banks according to various embodiments of the present disclosure.

As shown in FIG. 6, the memory bank 117A may include a normal region 211_1, a normal redundancy region 211_2, a hard redundancy region 211_3, and a soft redundancy region 211_4. Sub word lines SWL<1:L> may be located in the normal region 211_1. Each of the sub word lines SWL<1:L> may be implemented as a normal word line that is selectively driven by a row address RA. Normal redundancy word lines NRWL<1:M> may be located in the normal redundancy region 211_2. Each of the normal redundancy word lines NRWL<1:M> may be provided to replace one of sub word lines SWL<1:L> through a normal repair operation. Hard redundancy word lines HRWL<1:N> may be located in the hard redundancy region 211_3. Each of the hard redundancy word lines HRWL<1:N> may be provided to replace one of the sub word lines SWL<1:L> through a hard post package repair operation. Soft redundancy word lines SRWL<1:S> and dummy word lines DSWL may be located in the soft redundancy region 211_4. Each of the soft redundancy word lines SRWL<1:S> may be provided to replace one of the sub word lines SWL<1:L> through a soft post package repair operation. Because each of the soft redundancy word lines SRWL<1:S> is located between the dummy word lines DSWL, even if the driving for the soft redundancy word lines SRWL<1:S> is repeated according to the soft post package repair operation, the occurrence of the row hammer phenomenon may be prevented in advance.

Figure 7:
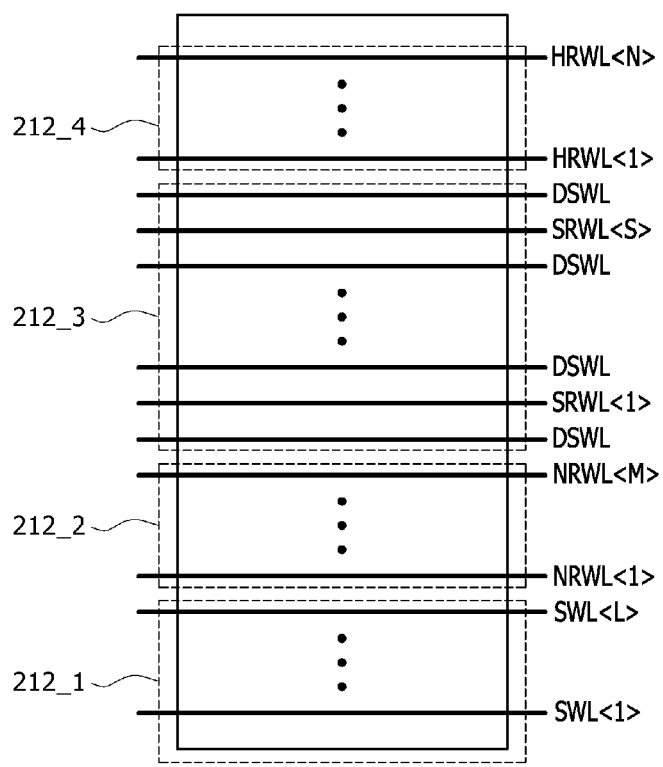

As shown in FIG. 7, the memory bank 117B may include a normal region 212_1, a normal redundancy region 212_2, a soft redundancy region 212_3, and a hard redundancy region 212_4. Sub word lines SWL<1:L> may be located in the normal region 212_1. Each of the sub word lines SWL<1:L> may be implemented as a normal word line that is selectively driven by a row address RA. Normal redundancy word lines NRWL<1:M> may be located in the normal redundancy region 212_2. Each of the normal redundancy word lines NRWL<1:M> may be provided to replace one of sub word lines SWL<1:L> through a normal repair operation. Soft redundancy word lines SRWL<1:S> and dummy word lines DSWL may be located in the soft redundancy region 212_3. Each of the soft redundancy word lines SRWL<1:S> may be provided to replace one of the sub word lines SWL<1:L> through the soft post package repair operation. Because each of the soft redundancy word lines SRWL<1:S> is located between the dummy word lines DSWL, even if the driving of the soft redundancy word lines SRWL<1:S> is repeated according to the soft post package repair operation, the occurrence of the row hammer phenomenon may be prevented in advance. Hard redundancy word lines HRWL<1:N> may be located in the hard redundancy region 212_4. Each of the hard redundancy word lines HRWL<1:N> may be provided to replace one of the sub word lines SWL<1:L> through a hard post package repair operation.

Figure 8:
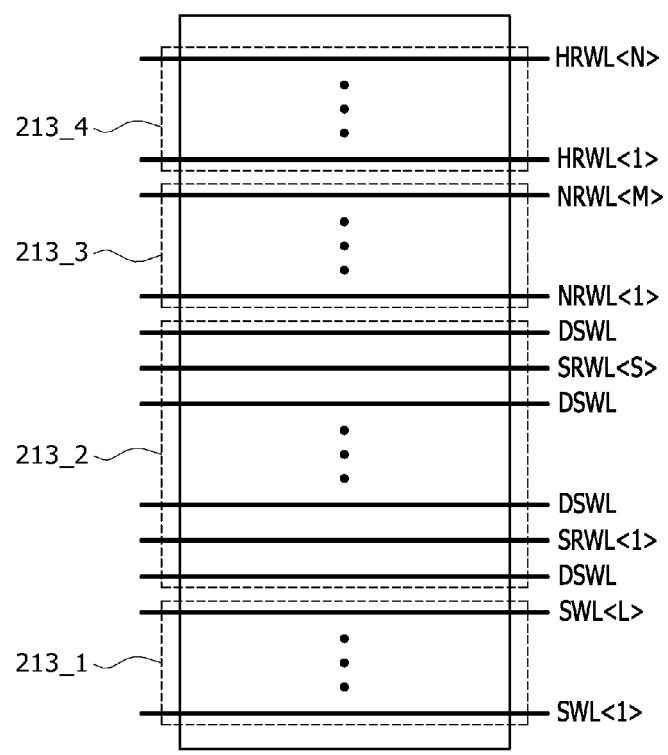

As shown in FIG. 8, the memory bank 117C may include a normal region 213_1, a soft redundancy region 213_2, a normal redundancy region 213_3, and a hard redundancy region 213_4. Sub word lines SWL<1:L> may be located in the normal region 213_1. Each of the sub word lines SWL<1:L> may be implemented as a normal word line that is selectively driven by a row address RA. Soft redundancy word lines SRWL<1:S> and dummy word lines DSWL may be located in the soft redundancy region 213_2. Each of the soft redundancy word lines SRWL<1:S> may be provided to replace one of the sub word lines SWL<1:L> through the soft post package repair operation. Because each of the soft redundancy word lines SRWL<1:S> is located between the dummy word lines DSWL, even if the driving of the soft redundancy word lines SRWL<1:S> is repeated according to the soft post package repair operation, the occurrence of the row hammer phenomenon may be prevented in advance. Normal redundancy word lines NRWL<1:M> may be located in the normal redundancy region 213_3. Each of the normal redundancy word lines NRWL<1:M> may be provided to replace one of the sub word lines SWL<1:L> through a normal repair operation. Hard redundancy word lines HRWL<1:N> may be located in the hard redundancy region 213_4. Each of the hard redundancy word lines HRWL<1:N> may be provided to replace one of the sub word lines SWL<1:L> through a hard post package repair operation.

Figure 9:
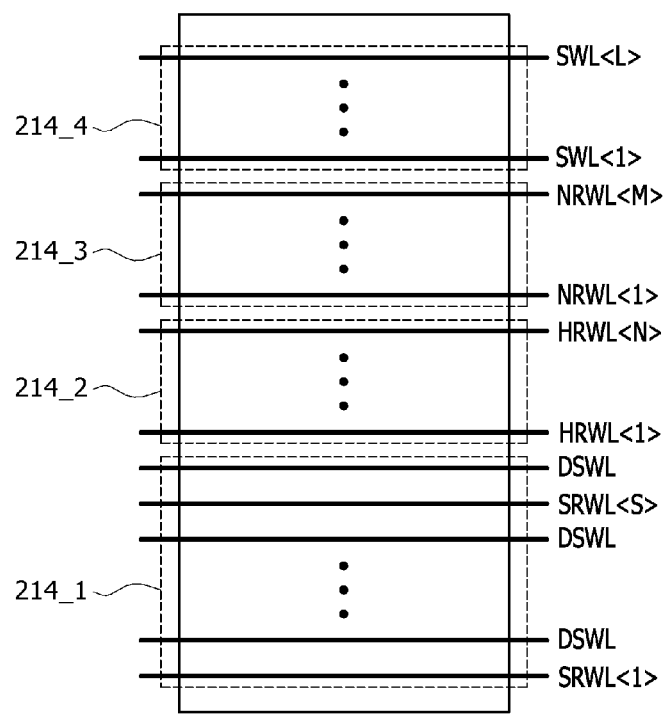

As shown in FIG. 9, the memory bank 117D may include a soft redundancy region 2141, a hard redundancy region 2142, a normal redundancy region 2143, and a normal region 214_4. Soft redundancy word lines SRWL<1:S> and dummy word lines DSWL may be located in the soft redundancy region 214_1. Each of the soft redundancy word lines SRWL<1:S> may be provided to replace one of sub word lines SWL<1:L> through the soft post package repair operation. Because each of the soft redundancy word lines SRWL<1:S> is located between the dummy word lines DSWL, even if the driving of the soft redundancy word lines SRWL<1:S> is repeated according to the soft post package repair operation, the occurrence of the row hammer phenomenon may be prevented in advance. Hard redundancy word lines HRWL<1:N> may be located in the hard redundancy region 214_2. Each of the hard redundancy word lines HRWL<1:N> may be provided to replace one of the sub word lines SWL<1:L> through a hard post package repair operation. Normal redundancy word lines NRWL<1:M> may be located in the normal redundancy region 214_3. Each of the normal redundancy word lines NRWL<1:M> may be provided to replace one of the sub word lines SWL<1:L> through a normal repair operation. Sub word lines SWL<1:L> may be located in the normal region 214_4. Each of the sub word lines SWL<1:L> may be implemented as a normal word line that is selectively driven by the row address RA.

The normal region, the normal redundancy region, the soft redundancy region, and the hard redundancy region are not limited to the configuration of the above-described memory banks 117A, 117B, 117C, and 117D, and may be implemented to be arranged in various forms.

FIG. 10 is a table illustrating an operation in which the second selection address SADD2 is generated in the second selection address generation circuit 113A shown in FIG. 5. As shown in FIGS. 5 and 10, the second selection address generation circuit 113A may generate the second selection address SADD2 according to a logic bit set of the first internal address IADD1 when the redundancy control signal RCNT is deactivated at a logic "low" level ("L"). That is, the second selection address generation circuit 113A may generate a second bit SADD2<2> of the second selection address SADD2 and a first bit SADD2<1> of the second selection address SADD2 which are set at a logic "low" level ("L") and set at a logic "high" level ("H"), respectively, when the second bit IADD1<2> of the first internal address IADD1 and the first bit IADD1<1> of the first internal address IADD1 are at a logic "low" level ("L") and at a logic "high" level ("H"), respectively, in a state in which the redundancy control signal RCNT is deactivated at a logic "low" level ("L"). In addition, the second selection address generation circuit 113A may generate the second bit SADD2<2> of the second selection address SADD2 and the first bit SADD2<1> of the second selection address SADD2 which are set at a logic "low" level ("L") and set to a logic "high" level ("H"), respectively, when the second bit IADD1<2> of the first internal address IADD1 and the first bit IADD1<1> of the first internal address IADD1 are at a logic "low" level ("L") and at a logic "high" level ("H"), respectively, in a state in which the redundancy control signal RCNT is deactivated at a logic "low" level ("L"). Meanwhile, as shown in FIGS. 5 and 10, the second selection address generation circuit 113A may generate the second selection address SADD2 according to the logic bit set of the fixed address FIXA when the redundancy control signal RCNT is activated at a logic "high" level ("H"). That is, the second selection address generation circuit 113A may generate the second bit SADD2<2> of the second selection address SADD2 and the first bit SADD2<1> of the second selection address SADD2 which are set at a logic "high" level ("H") and a logic "low" level ("L"), respectively, when the second bit FIXA<2> of the fixed address FIXA and the first bit FIXA<1> of the fixed address FIXA are at a logic "high" level ("H") and at a logic "low" level ("L"), respectively, in a state in which the redundancy control signal RCNT is activated at a logic "high" level ("H").

Figure 11:
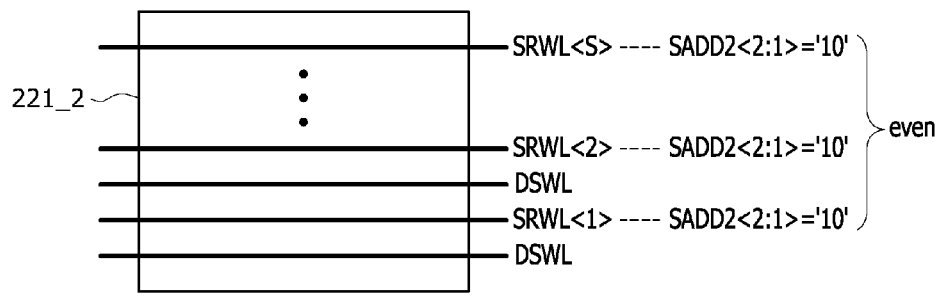
FIG. 11 is a diagram illustrating a sub word line and a soft redundancy word line that are selectively driven by a second selection address in the second selection address generation circuit according to an embodiment of the present disclosure.
Figure 11:
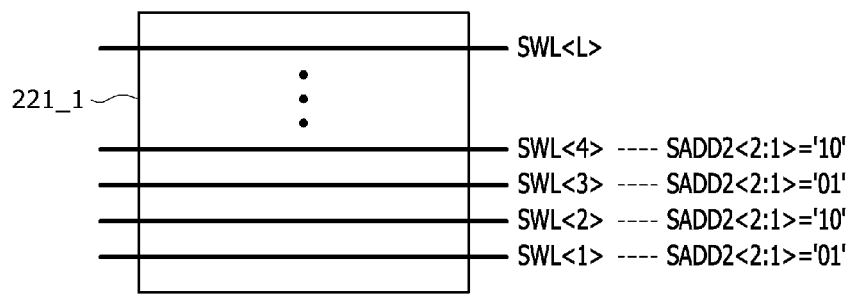

FIG. 11 is a diagram illustrating the sub word lines SWL and the soft redundancy word lines SRWL that are selectively driven by the second selection address SADD2 in the second selection address generation circuit 113A shown in FIG. 5.

As shown in FIG. 11, when the second selection address SADD2 is generated according to a logic bit set of the first internal address IADD1 because the row address RA is not the address repaired through the soft post package repair operation, odd-numbered sub word lines and even-numbered sub word lines among the sub word lines SWL<1:L> included in the normal region 221_1 may be distinguished from each other by the second selection address SADD2. As an example, when the second selection address SADD2<2:1> is set to have the logic bit set '01', one of the odd-numbered sub word lines SWL<1> and SWL<3> may be selected and driven. Here, the case in which the second selection address SADD2<2:1> is set to have the logic bit set '01' may mean that a second bit SADD2<2> of the second selection address is set at a logic "low" level and a first bit SADD2<1> of the second selection address is set at a logic "high" level. As another example, when the second selection address SADD2<2:1> is set to have the logic bit set '10', one of the even-numbered sub word lines SWL<2> and SWL<4> may be selected and driven.

Meanwhile, as shown in FIG. 11, when the second selection address SADD2 is generated according to the preset logic bit set by the fixed address FIXA because the row address RA is the address repaired through the soft post package repair operation, one of the soft redundancy word lines SRWL<1:S> included in the soft redundancy region 221_2 may be selected and driven by the second selection address SADD2<1:S>. As an example, when the second selection address SADD2<2:1> is set to have the logic bit set '10', one of the even-numbered soft redundancy word lines SRWL<1:S> may be selected and driven between the odd-numbered dummy word lines DSWL.

FIGS. 12 to 16 are diagrams illustrating an operation of a semiconductor device 10 according to an embodiment of the present disclosure. The operation of the semiconductor device 10 will be described with reference to FIGS. 12 to 16.

Figure 12:
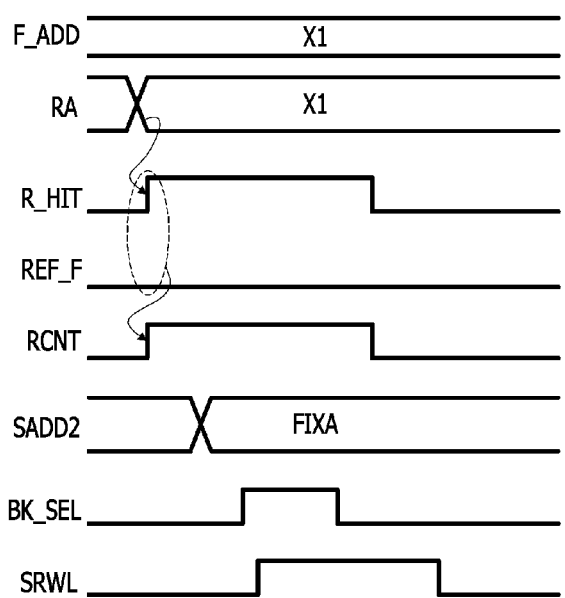
FIGS. 12 to 16 are diagrams illustrating an operation of a semiconductor device according to an embodiment of the present disclosure.

First, as shown in FIG. 12, when a row address RA for an active operation is input in the same combination X1 as a failure address F_ADD repaired through the soft post package repair operation, a repair detection signal R_HIT may be activated at a logic "high" level. Because a refresh flag REF_F may maintain an inactive state at a logic "low" level when a row hammer phenomenon for the row address RA does not occur, a redundancy control signal RCNT may be activated at a logic "high" level. Because the second selection address SADD2 is set to have a preset logic bit set by a fixed address FIXA when the redundancy control signal RCNT is activated at a logic "high" level, a soft redundancy word line SRWL may be selected and driven by a bank selection signal BK_SEL that is activated at a logic "high" level.

Figure 13:
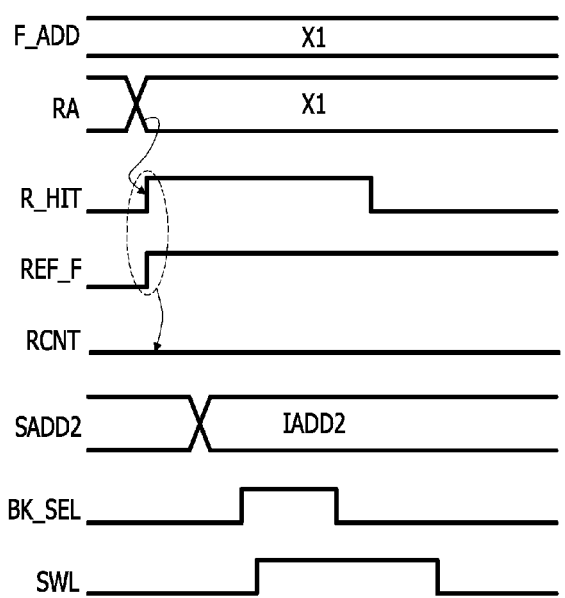

Next, as shown in FIG. 13, when the row address RA for the active operation is input in the same combination X1 as the failure address F_ADD that is repaired through the soft post package repair operation, the repair detection signal R_HIT may be activated at a logic "high" level. Because the refresh flag REF_F is activated at a logic "high" level when a row hammer phenomenon occurs with respect to the row address RA, the redundancy control signal RCNT may maintain an inactivate state at a logic "low" level. Because the second selection address SADD2 is generated by the second internal address IADD2 when the redundancy control signal RCNT is deactivated at a logic "low" level, the sub word line SWL may be selected and driven by the bank selection signal BK_SEL that is activated at a logic "high" level.

Figure 14:
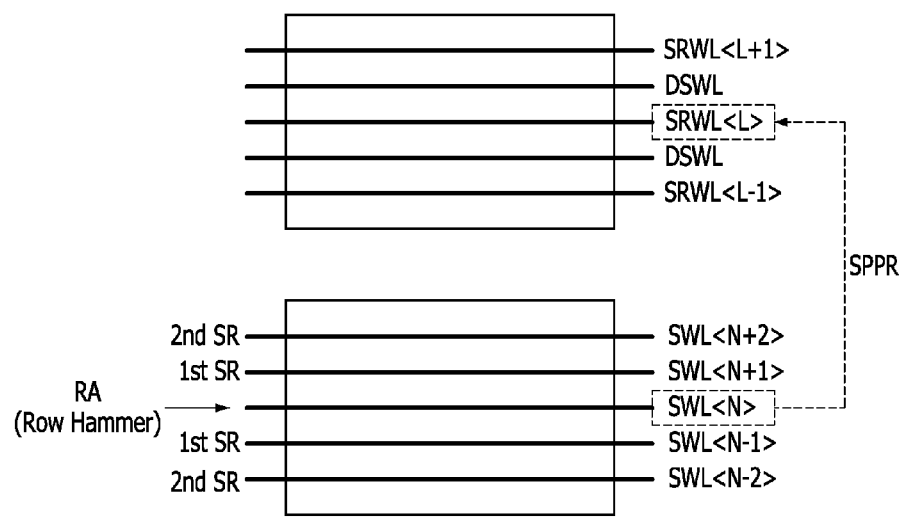

Next, as shown in FIG. 14, when a row hammer phenomenon for the row address RA occurs in a state in which the sub word line SWL<N> driven by the row address RA is replaced with the soft redundancy word line SRWL<L> through the soft post package repair (SPPR) operation, after a first refresh operation (1st SR) is performed on adjacent word lines SWL<N-1> and SWL<N+1>, a second refresh operation (2nd SR) may be additionally performed on adjacent word lines SWL<N-2> and SWL<N+2>. Because the soft redundancy word line SRWL is located between the dummy word lines DSWL, the refresh operation on the dummy word lines DSWL may be unnecessary. Accordingly, occurrence of the row hammer phenomenon in the soft redundancy word line SRWL may be prevented in advance. When the row hammer phenomenon occurs even if the sub word line SWL<N> driven by the row address RA is replaced with the soft redundancy word line SRWL<L> through the soft post package repair (SPPR) operation, a refresh operation may be performed on the adjacent word lines SWL<N-1>, SWL<N+1>, SWL<N-2>, and SWL<N+2> that are adjacent to the sub word line SWL<N>. Accordingly, it is possible to prevent the refresh operation from not being performed properly due to the row hammer phenomenon.

Figure 15:
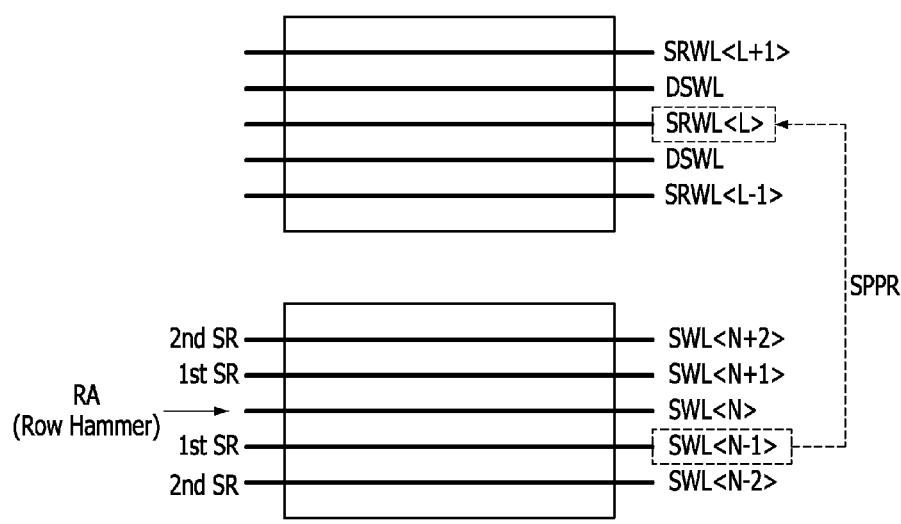

Meanwhile, as shown in FIG. 15, when a row hammer phenomenon for the row address RA occurs in a state in which the sub word line SWL<N-1> driven by the row address RA is replaced with the soft redundancy word line SRWL<L> through the soft post package repair (SPPR) operation, after a first refresh operation (1st SR) is performed on the adjacent word lines SWL<N-1> and SWL<N+1>, a second refresh operation (2nd SR) may be additionally performed on the adjacent word lines SWL<N−2> and SWL<N+2>. When the row hammer phenomenon occurs even if the sub word line SWL<N> driven by the row address RA is replaced with the soft redundancy word line SRWL<L> through the soft post package repair (SPPR) operation, a refresh operation may be performed on the adjacent word lines SWL<N−1>, SWL<N+1>, SWL<N−2>, and SWL<N+2> that are adjacent to the sub word line SWL<N>. Accordingly, it is possible to prevent the refresh operation from not being performed properly due to the row hammer phenomenon.

Figure 16:
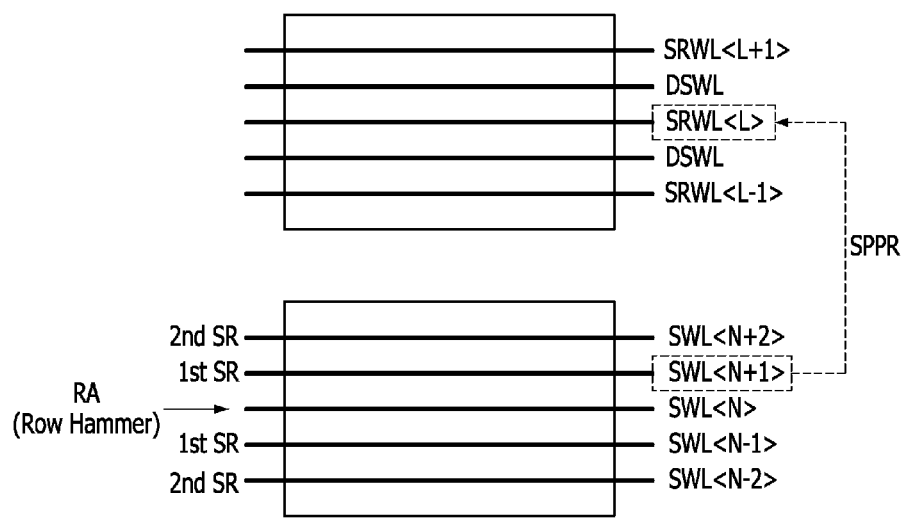

Finally, as shown in FIG. 16, when a row hammer phenomenon for the row address RA occurs in a state in which the sub word line SWL<N−1> driven by the row address RA is replaced with the soft redundancy word line SRWL<L> through the soft post package repair (SPPR) operation, after a first refresh operation (1st SR) is performed on the adjacent word lines SWL<N−1> and SWL<N+1>, a second refresh operation (2nd SR) may be additionally performed on adjacent word lines SWL<N−2> and SWL<N+2>. When the row hammer phenomenon occurs even if the sub word line SWL<N> driven by the row address RA is replaced with the soft redundancy word line SRWL<L> through the soft post package repair (SPPR) operation, a refresh operation may be performed on the adjacent word lines SWL<N−1>, SWL<N+1>, SWL<N−2>, and SWL<N+2> that are adjacent to the sub word line SWL<N>. Accordingly, it is possible to prevent the refresh operation from not being performed properly due to the row hammer phenomenon.

Figure 17:
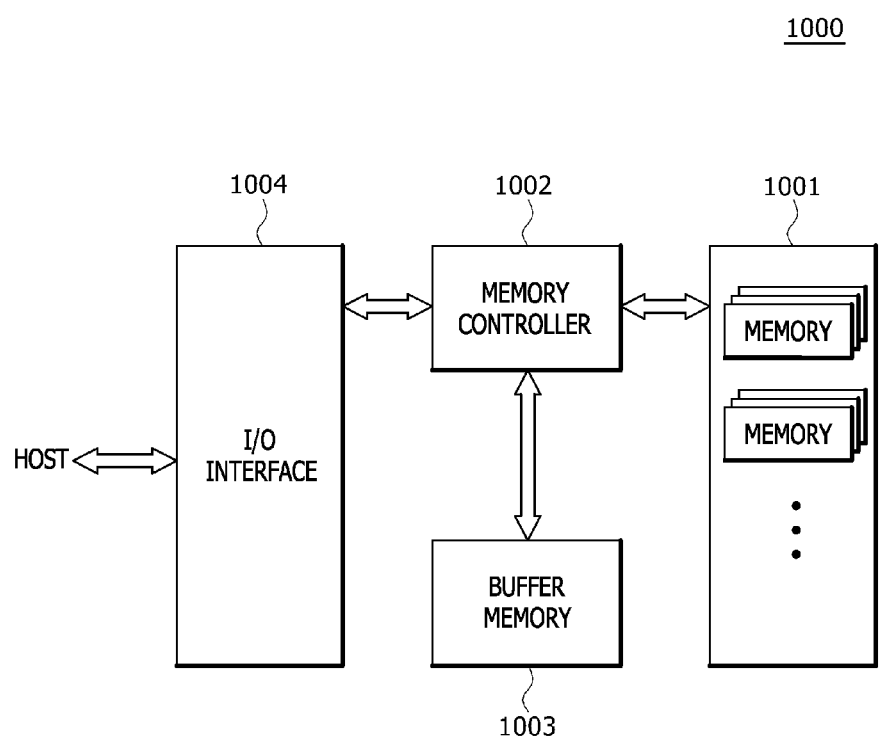
FIG. 17 is a block diagram illustrating a configuration of an electronic system according to an embodiment of the present disclosure.

The semiconductor device 10 described above with reference to FIG. 1 may be applied to an electronic system including a memory system, a graphic system, a computing system, a mobile system, and the like. For example, referring to FIG. 17, an electronic system 1000 according to an embodiment of the present disclosure may include data storage 1001, a memory controller 1002, a buffer memory, and an input/output (I/O) interface 1004.

The data storage 1001 may store data (not shown) that is applied from the memory controller 1002 according to a control signal from the memory controller 1002, and may read out stored data (not shown) to output the data to the memory controller 1002. Meanwhile, the data storage 1001 may include a non-volatile memory device capable of continuously storing data without losing data even when power is cut off. The non-volatile memory device may be implemented with a flash memory device (NOR flash memory device, NAND flash memory device), a phase change random access memory (PRAM) device, a resistive random access memory (RRAM) device, a spin transfer torque random access memory (STTRAM) device, or a magnetic random access memory (MRAM) device.

The memory controller 1002 may decode instructions applied from an external device (host device) through the I/O interface 1004, and may control data input and output for the data storage 1001 and the buffer memory 1003 according to a decoding result. Although the memory controller 1002 is represented as one block in FIG. 17, in the memory controller 1002, a controller for controlling the data storage 1001 and a controller for controlling the buffer memory 1003 which is a volatile memory device may be configured independently.

The buffer memory 1003 may temporarily store data to be processed by the memory controller 1002, that is, data input/output to/from the data storage 1001 (not shown). The buffer memory 1003 may store the data (not shown) applied from the memory controller 1002 according to a control signal. The buffer memory 1003 may include the semiconductor device 10 illustrated in FIG. 1. The buffer memory 1003 may read out stored data and output the data to the memory controller 1002. The buffer memory 1003 may include a volatile memory device such as a dynamic random access memory (DRAM) device, a mobile DRAM device, or a static random access memory (SRAM) device.

The I/O interface 1004 may provide physical connection between the memory controller 1002 and an external device (host device) to enable the memory controller 1002 to receive a control signal for data input/output from the external device and to exchange data with the external device. The I/O interface 1004 may include one of various interface protocols such as USB, MMC, PCI-E, SAS, SATA, PATA, SCSI, ESDI, and IDE.

The electronic system 1000 may be used as an auxiliary storage device or an external storage device of the host device. The electronic system 1000 may include a solid state disk (SSD), a universal serial bus (USB) memory, a secure digital (SD) card, a mini secure digital (mSD) card, a micro secure digital (micro SD) card, secure digital high capacity (SDHC), a memory stick card, a smart media (SM) card, a multimedia card (MMC), an embedded multimedia card (eMMC), a compact flash card (CF), and the like.

Figure 18:
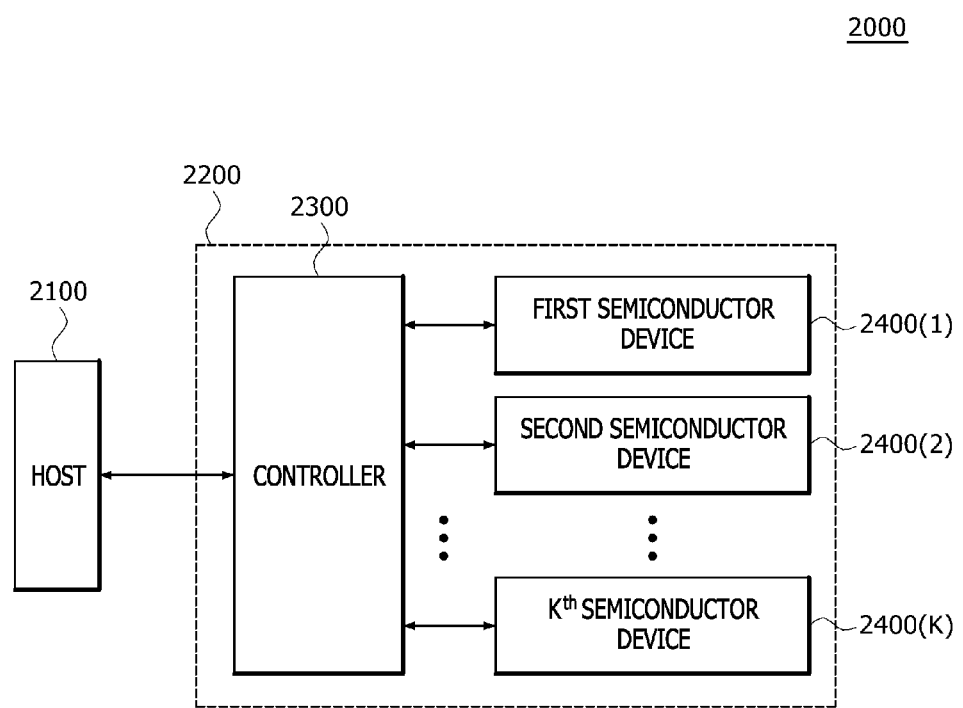
FIG. 18 is a block diagram illustrating a configuration of an electronic system according to another embodiment of the present disclosure.

FIG. 18 is a block diagram illustrating a configuration of an electronic system 2000 according to another embodiment of the present disclosure. As shown in FIG. 18, the electronic system 2000 may include a host 2100 and a semiconductor system 2200.

The host 2100 and the semiconductor system 2200 may transmit signals to each other using an interface protocol. The interface protocols used between the host 2100 and the semiconductor system 2200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), serial attached SCSI (SAS), universal serial bus (USB), and the like.

The semiconductor system 2200 may include a controller 2300 and semiconductor devices 2400(1:K). Each of the semiconductor devices 2400(1:K) may perform a refresh operation on adjacent word lines that are adjacent to a sub-word line SWL when a row address RA for an active operation is the address for which the soft post package repair operation is performed, and a row hammer phenomenon occurs to the row address RA. Each of the semiconductor devices 2400(1:K) may be implemented with one of a dynamic random access memory (DRAM) device, a phase change random access memory (PRAM) device, a resistive random access memory (RRAM) device, a magnetic random access memory (MRAM) device, and a ferroelectric random access memory (FRAM) device.

Concepts have been disclosed in conjunction with some embodiments as described above. Those skilled in the art will appreciate that various modifications, additions, and/or substitutions are possible, without departing from the scope and spirit of the present disclosure. Accordingly, the embodiments disclosed in the present specification should be considered from not a restrictive standpoint but rather from an illustrative standpoint. The scope of the concepts is not limited to the above descriptions but defined by the accompanying claims, and all of distinctive features in the equivalent scope should be construed as being included in the concepts.

What is claimed is:

1. A semiconductor device comprising:
a redundancy control signal generation circuit configured to generate a redundancy control signal by determining whether a row address for an active operation has been repaired through a soft post package repair operation and determining whether a row hammer phenomenon has occurred with respect to the row address;
a first selection address generation circuit configured to generate a first selection address for driving a sub word line or a redundancy word line from one of a repair address and a first internal address, based on the redundancy control signal, wherein the first selection address generation circuit comprises a first selector, and the first selector is configured to receive the repair address, the first internal address, and the redundancy control signal and is configured to output one of the repair address and the first internal address as the first selection address based on a logic level of the redundancy control signal;
a second selection address generation circuit configured to generate a second selection address for driving the sub word line or the redundancy word line from one of a fixed address and a second internal address, based on the redundancy control signal, wherein the second selection address generation circuit comprises a fixed address storage circuit and a second selector, wherein the fixed address storage circuit is configured to store and output the fixed address, and wherein the second selector is configured to receive the fixed address, the second internal address, and the redundancy control signal and is configured to output one of the fixed address and the second internal address as the second selection address based on the logic level of the redundancy control signal; and
a memory bank configured to include a normal region and a redundancy region,
wherein the redundancy region includes a soft redundancy word line driven for the soft post package repair operation, and a hard redundancy word line driven for a hard post package repair operation.

2. The semiconductor device of claim 1, wherein the redundancy control signal generation circuit is configured to generate the redundancy control signal, which is deactivated when the row address has not been repaired through the soft post package repair operation.

3. The semiconductor device of claim 1, wherein the redundancy control signal generation circuit is configured to generate the redundancy control signal, which is activated when the row address has been repaired through the soft post package repair operation and a row hammer phenomenon has not occurred with respect to the row address.

4. The semiconductor device of claim 1, wherein the redundancy control signal generation circuit is configured to generate the redundancy control signal, which is deactivated when the row address has been repaired through the soft post package repair operation and the row hammer phenomenon has occurred with respect to the row address.

5. The semiconductor device of claim 1, wherein the row address includes the first internal address and the second internal address.

6. The semiconductor device of claim 1, wherein the first internal address includes information on a word line selection signal and a main word line signal that are necessary to drive the sub word line.

7. The semiconductor device of claim 1, wherein the second internal address includes information for distinguishing odd-numbered sub word lines and even-numbered sub word lines among the sub word lines.

8. The semiconductor device of claim 1, wherein the first selection address generation circuit is configured to:
output the repair address as the first selection address to drive the redundancy word line when the redundancy control signal is activated; and
output the first internal address as the first selection address to drive the sub word line when the redundancy control signal is deactivated.

9. The semiconductor device of claim 1, wherein the second selection address generation circuit is configured to:
set the second selection address to have a preset logic bit set by the fixed address to drive the redundancy word line when the redundancy control signal is activated; and
output the second internal address as the second selection address to drive the sub word line when the redundancy control signal is deactivated.

10. The semiconductor device of claim 1, further comprising a sub word line drive control circuit configured to drive one of the sub word line, an adjacent word line located adjacent to the sub word line, and the redundancy word line, based on the first selection address, the second selection address, and a row hammer control signal.

11. The semiconductor device of claim 10, wherein the sub word line drive control circuit is configured to drive the sub word line when the row address has not been repaired through the soft post package repair operation.

12. The semiconductor device of claim 10, wherein the sub word line drive control circuit is configured to drive the redundancy word line when the row address has been repaired through the soft post package repair operation, and a row hammer phenomenon has not occurred with respect to the row address.

13. The semiconductor device of claim 10, wherein the sub word line drive control circuit is configured to drive the adjacent word line when the row address has been repaired through the soft post package repair operation, and a row hammer phenomenon has occurred with respect to the row address.

14. The semiconductor device of claim 10, further comprising a row hammer control circuit configured to generate the row hammer control signal, which is activated when a row hammer phenomenon has occurred with respect to the row address.

15. The semiconductor device of claim 10,
wherein the normal region in which the sub word line and the adjacent word line are located; and
the redundancy region in which the redundancy word line is located.

16. The semiconductor device of claim 15, wherein the redundancy word line is located between dummy word lines in the redundancy region.

17. The semiconductor device of claim 15,
wherein the redundancy region further includes a normal redundancy region,
wherein the soft redundancy word line is located between the dummy word lines in the soft redundancy region,
wherein the hard redundancy word line is located in the hard redundancy region, and
wherein a normal redundancy word line is located in the normal redundancy region.

18. A semiconductor device comprising:
a first selection address generation circuit, wherein the first selection address generation circuit comprises a first selector, and the first selector is configured to receive a repair address, a first internal address, and a redundancy control signal and is configured to output one of the repair address and the first internal address as a first selection address based on a logic level of the redundancy control signal;

a second selection address generation circuit, wherein the second selection address generation circuit comprises a fixed address storage circuit and a second selector, wherein the fixed address storage circuit is configured to store and output a fixed address, and wherein the second selector is configured to receive the fixed address, a second internal address, and the redundancy control signal and is configured to output one of the fixed address and the second internal address as a second selection address based on the logic level of the redundancy control signal;

a sub word line drive control circuit configured to latch the first selection address and the second selection address and configured to drive one of a sub word line, an adjacent word line located adjacent to the sub word line, a redundancy word line by determining whether a row address for an active operation has been repaired through a soft post package repair operation and determining whether a row hammer phenomenon has occurred with respect to the row address; and a memory bank including a normal region in which the sub word line and the adjacent word line are located, and a redundancy region in which a soft redundancy word line and a hard redundancy word line are located, wherein the soft redundancy word line is driven for the soft post package repair operation, and the hard redundancy word line is driven for a hard post package repair operation.

19. The semiconductor device of claim 18, wherein the sub word line drive control circuit is configured to drive the sub word line when the row address has not been repaired through the soft post package repair operation.

20. The semiconductor device of claim 18, wherein the sub word line drive control circuit is configured to drive the sub word line when the row address has been repaired through the soft post package repair operation, and a row hammer phenomenon has not occurred with respect to the row address.

21. The semiconductor device of claim 18, wherein the sub word line drive control circuit is configured to drive the adjacent word line when the row address has been repaired through the soft post package repair operation, and a row hammer phenomenon has occurred with respect to the row address.

22. The semiconductor device of claim 18, further comprising a row hammer control circuit configured to generate the row hammer control signal, which is activated when a row hammer phenomenon has occurred with respect to the row address.

23. The semiconductor device of claim 18, wherein the redundancy word line is located between dummy word lines in the redundancy region.

24. The semiconductor device of claim 18,
wherein the redundancy region includes a soft redundancy region, a hard redundancy region, and a normal redundancy region,
wherein the soft redundancy word line is located between the dummy word lines in the soft redundancy region,
wherein the hard redundancy word line is located in the hard redundancy region, and
wherein a normal redundancy word line is located in the normal redundancy region.

25. The semiconductor device of claim 1, wherein the soft post package repair operation is executed based on failure address information deleted when the power is turned off.

26. The semiconductor device of claim 1, wherein the hard post package repair operation is executed based on failure address information maintained when the power is turned off.

* * * * *